(12) United States Patent
Giterman et al.

(10) Patent No.: US 12,321,426 B2
(45) Date of Patent: Jun. 3, 2025

(54) STORAGE ARRAY PROTECTION USING SIGNED TOKEN

(71) Applicant: Dell Products L.P., Round Rock, TX (US)

(72) Inventors: Boris Giterman, Beer Sheva (IL); Arieh Don, Newton, MA (US); Efi Levi, Beer Sheva (IL); Lior Benisty, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 18/358,251

(22) Filed: Jul. 25, 2023

(65) Prior Publication Data

US 2025/0036727 A1   Jan. 30, 2025

(51) Int. Cl.
*G06F 21/31* (2013.01)
*G06F 21/60* (2013.01)
*G06F 21/62* (2013.01)

(52) U.S. Cl.
CPC ............ *G06F 21/31* (2013.01); *G06F 21/602* (2013.01); *G06F 21/6281* (2013.01)

(58) Field of Classification Search
CPC ..... G06F 21/31; G06F 21/602; G06F 21/6281
See application file for complete search history.

(56) References Cited

U.S. PATENT DOCUMENTS

| | | | | |
|---|---|---|---|---|
| 9,882,913 | B1* | 1/2018 | Borowiec | H04L 67/10 |
| 11,048,806 | B2* | 6/2021 | Degeneve | H04L 9/3265 |
| 11,163,908 | B2* | 11/2021 | Zankharia | G06F 21/6218 |
| 11,503,031 | B1* | 11/2022 | Hu | H04L 67/1097 |
| 11,610,004 | B2* | 3/2023 | Yedluri | G06F 21/64 |
| 11,792,204 | B2* | 10/2023 | Grover | H04L 9/088 |
| | | | | 713/166 |
| 11,847,232 | B2* | 12/2023 | Fabjański | G06F 21/602 |
| 11,893,143 | B2* | 2/2024 | Cao | G06F 3/0623 |
| 12,184,783 | B2* | 12/2024 | Michael | G06F 21/31 |
| 2022/0156391 | A1* | 5/2022 | Fang | G06F 21/606 |
| 2022/0366070 | A1* | 11/2022 | Glas | G06F 21/6227 |

* cited by examiner

*Primary Examiner* — Viral S Lakhia
(74) *Attorney, Agent, or Firm* — WOMBLE BOND DICKINSON (US) LLP

(57) ABSTRACT

Methods and systems for securing data are disclosed. To secure data, signed tokens may be used to authenticate operations to be performed by storage arrays. The operations may modify data stored in the storage array and/or provide copies of stored data. The signed token may specify limits on the authority of various entities to invoke various functions of storage arrays, and include cryptographic data usable by the storage arrays to authenticate the tokens. By requiring that tokens be included with operations to be performed by storage arrays, the storage arrays may be less likely to perform undesired operations.

20 Claims, 6 Drawing Sheets

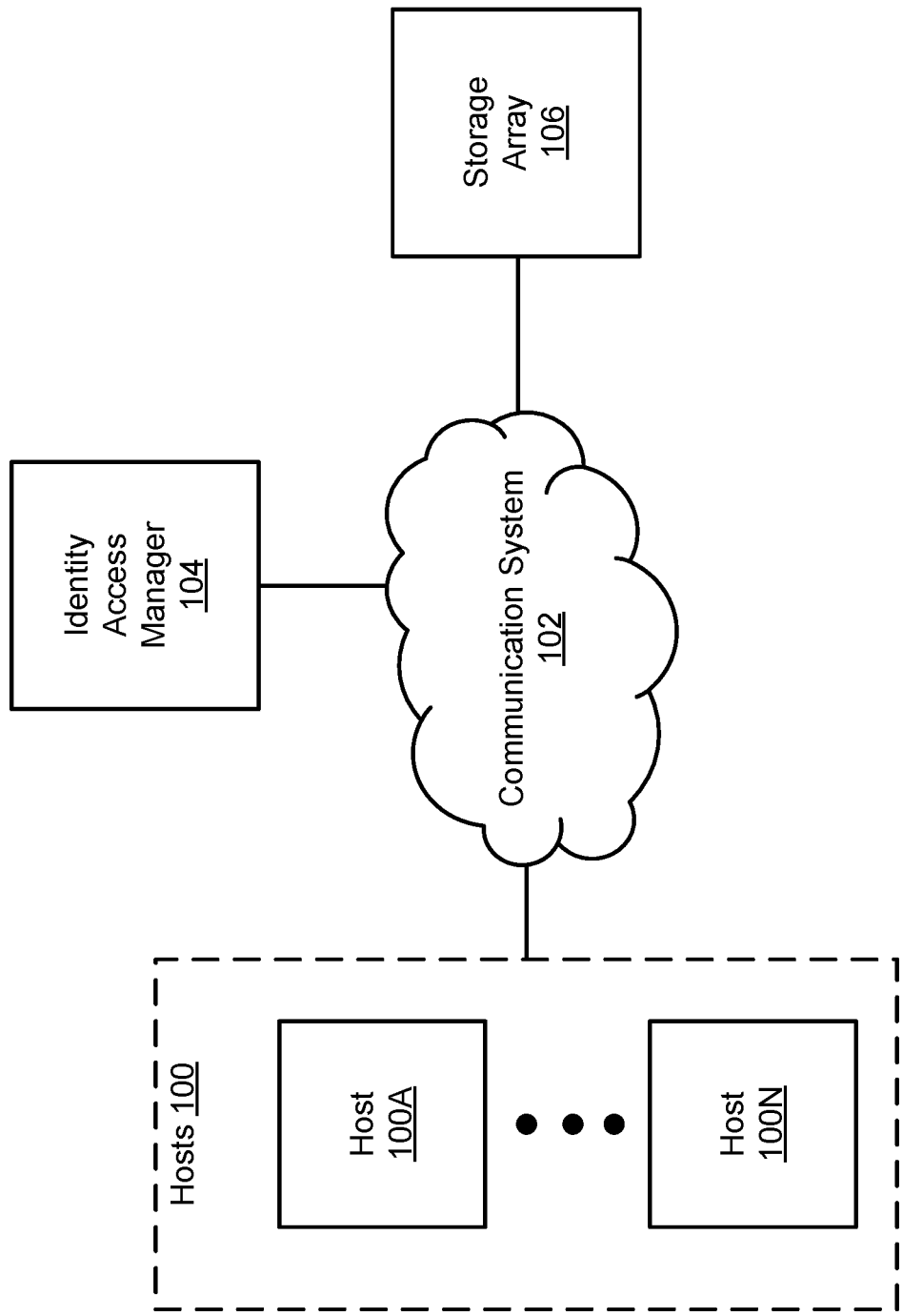

STORAGE ARRAY PROTECTION USING SIGNED TOKEN

FIELD

Embodiments disclosed herein relate generally to device management. More particularly, embodiments disclosed herein relate to managing devices using security models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a diagram illustrating a system in accordance with an embodiment.

DETAILED DESCRIPTION

Figure 2A:
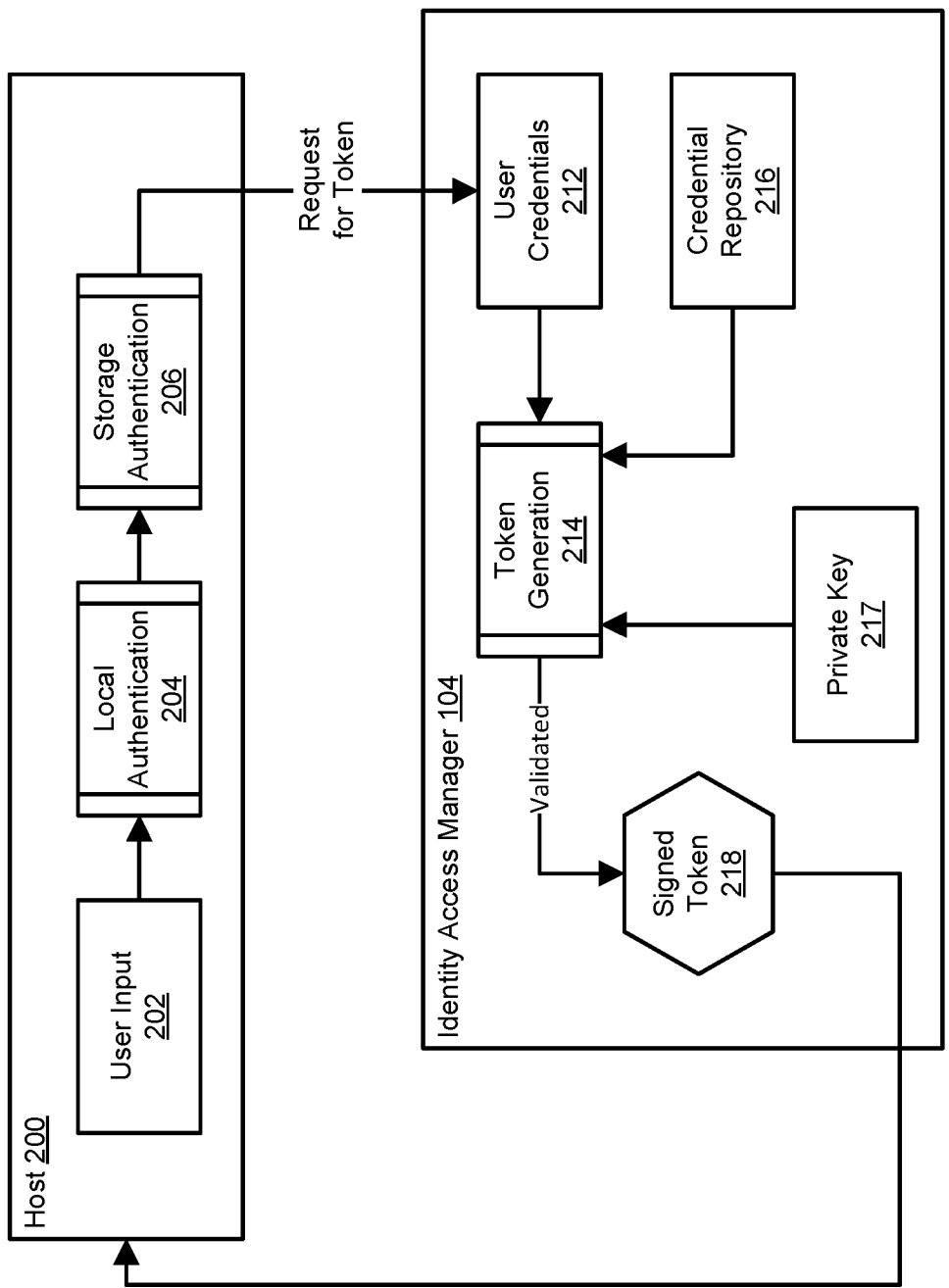
FIG. 2A shows a first data flow diagram illustrating operation of a portion of a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to the methods and systems for securing data managed by storage arrays. Storage arrays may provide data storage and access services to any number of hosts. In being accessible by one or more hosts, the storage arrays may be susceptible to security vulnerabilities. A source of the security vulnerabilities may be through the hosts and/or other devices operably connected to the storage arrays. If a malicious actor may gain access to any of the hosts to which one or more storage arrays may be connected, the malicious actor may perform one or more unauthorized operations on data within the storage arrays.

In performance of one or more unauthorized operations on the storage array, the storage array may not be aware of which hosts may be performing the operations. Also, the storage array may not be aware of which applications may be performing the operations. The storage array may only receive the operations from the host. Consequently, the storage array may modify stored data making desired data inaccessible, and/or may provide access to sensitive data.

To improve the security of data in storage arrays, embodiments disclosed herein may implement a system for verifying sources of commands issued to storage arrays prior to performing the commands. To implement the system, signed tokens may be issued to trusted entities in the system. The signed token may be appended to an operation that may be performed on a storage array. The signed token may include the identity of the entity issuing the operation to the storage array, the permissions that the entity may have regarding use of the storage array, and/or a signature (or other type of information usable to verify the token).

When an operation issued by another entity is obtained by the storage array, the token may be extracted and verified using the signature included in the token. If verified, the storage array may verify the identity and permissions of the entity that issued the operation. If the operation is within the permissions for the entity, the storage array may perform the operation.

By doing so, embodiments disclosed herein may improve the security of data used to provide computer implemented services. By requiring that tokens be provided as a prerequisite for use of storage services provided by storage arrays, the storage arrays may be less likely to perform undesired operation that may result in data loss, exposure of sensitive data to unauthorized entities, and/or other types of undesired outcomes.

In an embodiment, a method for securing data is provided. The method may include (i) identifying an operation for performance by a storage array, (ii) generating a request to execute the operation by the storage array, (iii) adding a token to the request to obtain a modified request, the token being cryptographically verifiable by the storage array, (iv) providing the modified request to the storage array, and (v) obtaining a response from the storage array, the response indicating whether the operation is performed by the storage array based on the request.

The method may include obtaining the token from an identity management system.

Obtaining the token may include (i) obtaining, by the identity management system, credentials for a user that is attempting to initiate performance of the operation by the storage array, (ii) attempting, by the identity management system, to authenticate the credentials, (iii) in a first instance of the attempting where the credentials are authenticated: generating, by the identity management system, the token, the token comprising a private key signature and permissions of a user use of the storage array, and providing, by the identity management system, the token to a system that a user is using, (iv) and in a second instance of the attempting where the credentials are not authenticated: denying, by the identity management system, the token to the user.

Adding the token to the request may include (i) appending the token to the request as a first block in the request to obtain the modified request, and (ii) increasing a payload size of the request by one block.

The method may further include (i) extracting, by the storage array, the token from the modified request, and (ii) attempting, by the storage array, to validate that the request is trustworthy using the token.

The method may further include (i) in a first instance of the attempting where the request is trustworthy: performing, by the storage array, the operation based on permission for the operation on the storage array specified by the token; and (ii) in a second instance of the attempting where the request is not trustworthy: denying, by the storage array, performance of operation.

Attempting to validate that the request is trustworthy using the token may include checking, by the storage array, a signature from the token using a public key associated with an identity management system that generated the token.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

When the computer implemented services are performed, new data may be obtained and previously obtained data may be used. The new data may be stored in local and/or remote storage and previously obtained data may be accessed in the local and/or remote storage.

To facilitate use of remote storage (i.e., remote to a device that is generating/accessing data), the system of FIG. 1 may include storage array 106. Storage array 106 may provide data management services and may be remote to the devices that generate and/or use data. The data management services may include storing data and providing access to previously stored data.

To use the data management services provided by storage array 106, devices of FIG. 1 may direct input-output (IO) to storage array 106. The IO may include storage commands such as read command, write command, deletion commands, etc.

When IO is obtained by storage array 106, the storage array may process the IO. For example, in response to write commands, storage array 106 may store data.

However, processing of IO may limit access to data. For example, if a first device stores data in storage array 106, a second device may direct IO to storage array 106 that results in the data being deleted. Consequently, the first device that previously requested that the data be stored may no longer be able to access the data in the future.

A malicious entity (e.g., a compromised device, an interloper device) may attempt to use the above approach to prevent the first device from being able to continue to provide desired computer implemented services which may require access to the unavailable data.

Further, a malicious entity may use a similar approach to gain access to data. For example, the malicious entity may direct IO to storage array 106 to read data stored there by another device.

In general, embodiments disclosed here relate to systems and methods for securing data in distributed systems. To secure data in distributed systems, the system of FIG. 1 may implement a distributed security model across multiple components of a system. The distributed security model may ensure that all IO is verified as being from a trusted source prior to processing of the IO.

To verify that the IO is from a trusted source, the distributed security model may require that the IO is authenticated. Authenticating the IO may improve the likelihood that command from the IO and performed by the distributed system are not malicious in nature and that are authorized command.

For example, if a storage array that does not implement the distributed security model receives malicious IO (e.g., IO that impairs the use of data, facilitates breach of otherwise secure data, etc.), the storage array may automatically process the malicious IO. However, through implementation of the distributed security model, storage array 106 may prevent unauthorized users from accessing secure data, deleting data that would otherwise be retained, and/or otherwise breaching the security of data.

To authenticate the IO, storage arrays may require that IO include a signed token. The signed token may facilitate verification that the IO is from a trusted source.

To verify the IO using included signed tokens, a cryptographically verifiable signature in the IO may be checked using a trusted public key. If successfully verified, the IO may be processed. Otherwise, the IO may be rejected.

To provide the above noted functionality, the system may include hosts 100, identity and access manager 104, storage array 106, and communication system 102. Each of the components is discussed below.

Figure 2B:
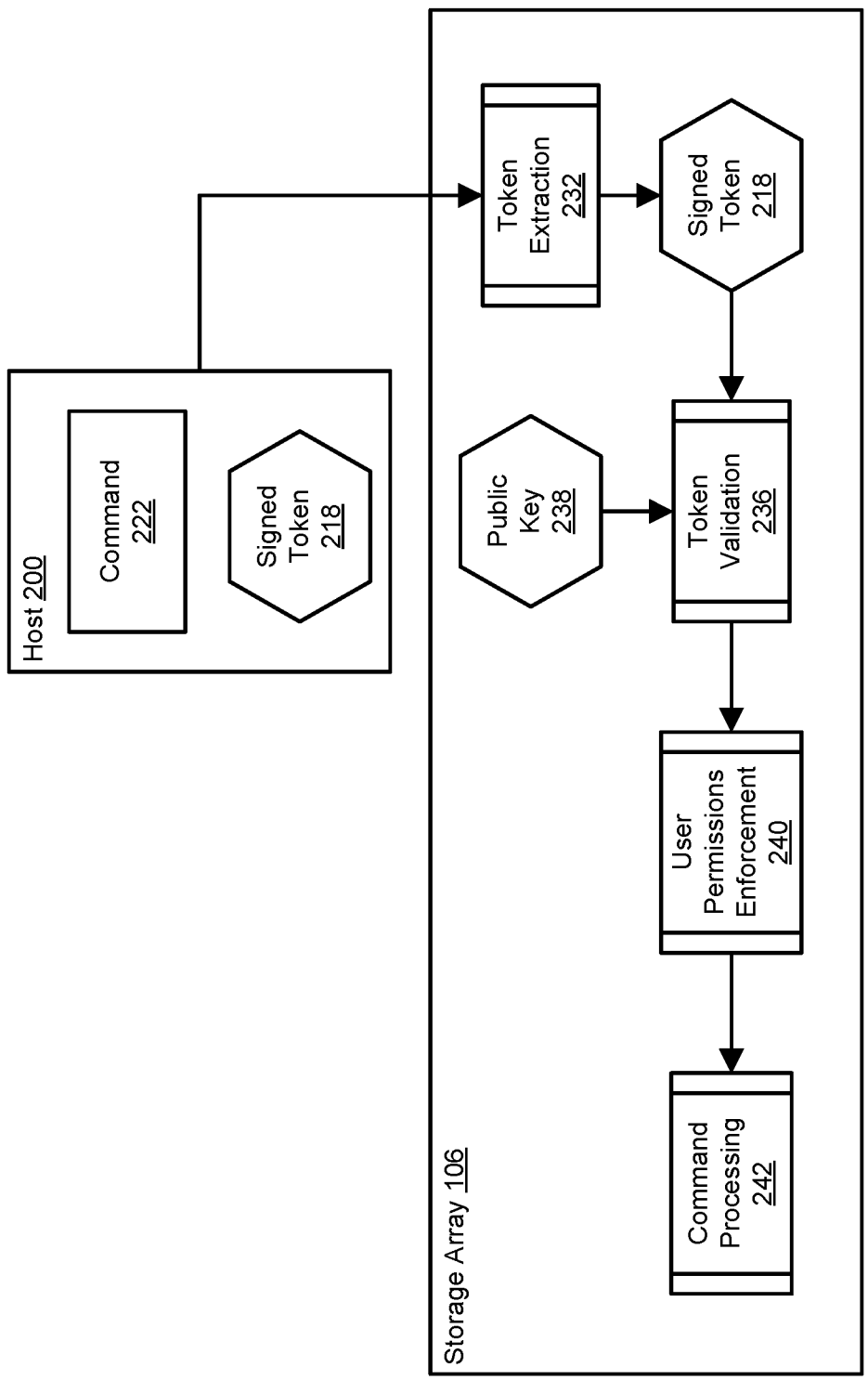
FIG. 2B shows a second data flow diagram illustrating operation of a portion of a system in accordance with an embodiment.

Hosts 100 may provide the computer implemented services, discussed above. To provide the computer implemented services, hosts 100 may utilize services provided by storage array 106 by directing IO to storage array. To utilize the services provided by storage array 106, any of hosts 100 may (i) generate requests (e.g., read/write/etc.) for storage array 106, (ii) add a token (e.g., a signed token) to the request to enable storage array 106 to ascertain whether the requests are from a trusted entity, and (iii) provide the requests to storage array 106 to service the requests. Refer to FIG. 2B for additional details regarding hosts 100 use of services provided by storage array 106. Hosts 100 may obtain the token from identity access manager 104. To do so, a user of a host may supply identity access manager 104 with credentials (e.g., username, password, etc.) and/or other information. If successfully authenticated using the credentials, identity access manager 104 may the token. Refer to FIG. 2A for additional details regarding tokens.

Identity access manager 104 may provide identification and access management services. To provide the identification and access management services, identity access manager 104 may cooperate with hosts 100 and storage array 106. To cooperate with hosts 100 and storage array 106, identity access manager 104 may authenticate of any of hosts 100 for access to storage array 106. To begin authentication, the host may supply identity access manager 104 with the user's credentials and request a signed token. The token may include the details about the user, such as (i)

source information, such as the host's media access control (MAC) address on the host's network interface card, (ii) the world wide name (WWN) for storage array 106 on which a command may be executed, and (iii) the permissions given to the user by identity access manager 104. Additionally, the token may be signed with a private key maintained by identity access manager 104. Upon successful authentication of the user, identity access manager 104 may return a signed token with the private key. The signed token may be used by the hosts to authenticate the IO to storage array 106 using the public key corresponding to the private key maintained by identity access manager 104. Refer to FIG. 2A for additional details regarding generation of a signed token.

Storage array 106 provide data storage services. To provide the data storage services, storage array 106 may cooperate with identity access manager 104 by validating IO from hosts using signed tokens included in the IO using the public key corresponding to the private key maintained by identity access manager 104. To validate the IO, storage array 106 may (i) extract the signed token from the request (e.g., IO) from any of hosts 100, (ii) check the authenticity of the signed token using the public key, and (iii) presuming that the signed token is authentic, enforce the permissions for host access to storage array 106 as specified by the token. Refer to FIG. 2B for additional details on validation of the token.

Thus, as identified in FIG. 1, a system in accordance with an embodiment may identify hosts 100 and storage array 106 with additional data security. Upon input of a username and password, hosts 100, a user may gain local authentication. Execution of a command by the user may prompt storage authentication by identity access manager 104. Successful storage authentication may yield a token that may be affixed to a command and/or other types of IO directed to a storage array and initiated by the user. The token may be extracted from the IO by the storage array to validate the identity of the user who initiated the IO. Validation of the token may permit execution of commands in the IO on storage array 106.

Any of (and/or components thereof) hosts 100, identity access manager 104, and storage array 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Storage array 106 may be implemented using any number of storage devices including, for example, hard disk drives, solid state storage devices, tape drives, storage controllers, and/or other devices that facilitate storage of data.

Communication system 102 may illustrate communication between hosts 100 and the entities of the system, identity access manager 104 and storage array 106. The system and its components may be onsite on the premises of an organization or personal server, existing in the cloud, or some combination thereof. A combination of locations may include, but not be limited to, the server perhaps and identity access manager 104 being onsite while storage array 106 may be located in the cloud. Any combination of locations for the entities of the system may require communication system 102 to facilitate input/output (I/O) operations and data transfer between the component entities.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

Communication system 102 may be implemented using a communication fabric and/or other communication architecture. The communication architecture may implement various protocols and interfaces including, for example, the Small Computer System Interface (SCSI).

While illustrated in FIG. 1 as including a limited number of specific components, a system in accordance with an embodiment may include fewer, additional, and/or different components than those components illustrated therein.

To further clarify embodiments disclosed herein, data flow diagrams are shown in FIG. 2A-2B. These data flow diagrams show flows of data that may be implemented by the system of FIG. 1. In FIG. 2A, an example token generation process is illustrated. In FIG. 2B, an example of command processing using the token is illustrated.

Turning to FIG. 2A, a first data flow diagram illustrating token generation in accordance with an embodiment is shown. To facilitate use of storage services provided by a storage array, host 200 may initiate (e.g., based on user input) a process through which a signed token may be obtained.

To initiate the process, host 200 may obtain user input 202. To do so, host 200 may prompt a user to enter information including, for example, credentials, user names, etc. to authenticate a user of host 200 to identity access manager 104.

The credentials may include a username and password set that may be validated by local authentication 204 for host 200. While described with respect to example credentials, it will be appreciated that other credentials such as two-factor authentication, biometric verification (e.g., thumbprints), and/or other types of credentials may be solicited and used by host 200, which may depend on implementation of the system of FIG. 1 (e.g., whether onsite on a proximate location to the user or in the cloud).

Once obtained, user input 202 may be ingested by local authentication 204 process. During local authentication process, the credentials may be compared to trusted credentials. If trusted, then the user may be allowed to use host 200.

While using host 200, the user may run a command that causes host 200 to cooperate with a storage array. For example, the user may run a command that requests data from a storage array, requests that data be deleted from the storage array, etc.

However, as noted above, the storage array may limit use of its storage services by requiring that signed token be included in IO directed to the storage array. Consequently, prior to generating and directing IO to the storage array, host 200 may perform storage authentication 206 to attempt to obtain a signed token. identity access manager 104

To obtain the signed token, host 200 may pass the user's credentials (e.g., 212) to identity access manager 104. Once provided to identity access manager 104, user credentials 212 may be ingested by token generation process. During token generation process 212, identity access manager 104 may attempt to verify user credentials 212 from the set of user credentials. To do so, identity access manager 104 may compare or otherwise use information stored in credential repository 216. Credential repository 216 may include information usable to verify user credentials 212. For example, credential repository 216 may include credentials of trusted users.

Once user credentials 212 may be verified, token 218 may be generated as part of token generation process 214. Signed token 218 may be passed to host 200. Once passed to host 200, host 200 may include signed token 218 in IO directed to the storage array and through which the IO may be validated by the storage array.

Host 200 may be implemented using a device such as, but not limited to, a laptop, desktop computer, or smartphone. Host 200 may include identifiers such as an internet protocol (IP) address, MAC address, and/or host identifier (HostID). The identifiers of host 200 may be known to the system described in FIG. 1 and may therefore have permission to access it. Access to the system described in FIG. 1 may require user input 202. Host 200 may be similar to any of hosts 100.

User input 202 may be implemented using one or more data structures that may include all information used to access host 200 and validate the user of host 200 to identity access manager 104. Such information may include but not be limited to a username and password set, two-factor authentication, thumbprint, and/or certificates. One or more of sets of information may be locally authenticated by host 200.

For example, consider a scenario where a system similar to that depicted in FIG. 1 is being used by an organization at a particular location. In this example scenario, the system used by the organization may be implemented using on-site components rather than cloud based components. By virtue of being on-site, user of the system may be naturally restricted to specific persons such as employees of the organization that may also be on-site.

In this onsite system, a user may desire to gain access to run a program in storage array 106 to modify data that may exist in storage array 106. The onsite system may be configured to authenticate a username and password set, two-factor authentication, and certificates from the user's laptop. To access the system, the user may input their username and password set. Following input of their username and password, the system may search for the certificates to prove the identity of the user associated with the username and password. Finally, two-factor authentication may commence through sending a code to the user's cellular phone, which the user may need to input into the system. Using the username and password set, certificates, and two-factor authentication, the user may undergo local authentication.

Local authentication 204 may be implemented using a process. The process may include validation of host 200. Validation of host 200 may take place through validation of user credentials that may be input or sent by the user to the system, such as, but not limited to, a username and password set, certificates, and/or two-factor authentication messages.

Storage authentication 206 may be implemented using a process. The process may initiate further validation of the identity of the user. The purpose of further validation may be to inform storage array 106 of who may be accessing data on storage array 106 and performing I/O operations. To access data and perform I/O operations on storage array 106, a request for a token may be made to identity access manager 104.

Identity access manager 104 may be implemented using a device that manages multiple security processes. These processes may include but not be limited to single sign-on, certificate verification, two-factor or multifactor authentication, verification of username and password sets, and token generation. Identity access manager 104 may manage security processes not only for host access but also for storage array access. In addition, identity access manager 104 may include a repository of user identities. Therefore, to authenticate a user, identity access manager 104 may request user credentials 212 as a part of the authentication process.

User credentials 212 may be implemented using one or more data structures. The data structure may include details about a user. Examples of user credentials 212 may include but not be limited to (i) the username and password set that may have been used for local authentication, (ii) the IP address, MAC address, HostID and all other identifiers for the host that may be commonly used by the user, and (iii) any biometric data associated with the user that may have been used to gain physical access to an onsite system. This data may be validated by identity access manager 104 using data from credential repository 216.

Continuing with the example of the onsite system, the user may begin storage authentication to be able to access storage array 106 and execute I/O operations. To access storage array 106, a request for a signed token may have been made to identity access manager 104. User credentials 212 may have been passed to identity access manager 104. Identity access manager 104 may match one or more components of user credentials 212 to data within credential repository 216 to validate the user.

Credential repository 216 may be implemented using one or more data structures. The data structure may store all the credentials of every user known to identity access manager 104. Through storage of all the credentials of every user known to identity access manager 104, identity access manager 104 may govern who has access to the system described in FIG. 1 and to storage array 106 in FIG. 1.

Continuing with the example of the onsite system, user credentials 212 may the subject of a search within credential repository 216. As credential repository 216 may include all users known to identity access manager 104, identity access manager 104 may govern who may be locally authenticated and may gain authentication to storage array 106. In this case, the credentials of the user may be found in credential repository 216 and therefore may cause initiation of token generation 214.

Token generation 214 may be implemented using a process. The process may govern generation of token 218. Token 218 may be fabricated by identity access manager 104 once user credentials 212 may have been confirmed to exist within credential repository 216.

Continuing with the example of the onsite system, token generation 214 may commence once user credentials 212 may be confirmed to exist within credential repository 216. Confirmation of user credentials 212 may make the user entitled to a token. Signed token 218 may be fabricated specifically for use by user when accessing storage array 106.

Private key 217 may be implemented using a data structure. The data structure may be used by identity access manager 104 to sign signed token 218. To permit authentication of signed token 218, private key 217 may be associated with a public key on storage array 106.

Signed token 218 may be implemented using one or more data structures. The data structure may be fabricated by identity access manager 104. Identity access manager 104 may sign a data structure using private key 217 to obtained signed token 218. Signed token 218 may also include (i) user credentials, (ii) information regarding host 200, such as the IP address, MAC address, or HostID identifier, (iii) information for a specific volume of storage array 106 on which the user seeks to run applications or execute I/O operations, (iv) permissions granted to the user for operations on storage array 106, and (v) a signature using a private key.

Continuing with the example of the onsite system, token generation 214 may have fabricated signed token 218 for the user. Signed token 218 may include information necessary to the user to permit operations on one or more volumes of storage array 106. With signed token 218, host 200 may begin to issue IO to the storage array to perform desired commands such as reading data, writing data, deleting data, etc.

Thus, in FIG. 2A, a diagram illustrating signed token generation in accordance with an embodiment is shown. Host 200 access to storage array 106 may be authenticated by identity access manager 104. Authentication by identity access manager 104 may result in generation of signed token 218. Signed token 218 may be obtained by host 200 so that storage array 106 may authenticate IO issued by host 200.

After signed token 218 is obtained by host 200, host 200 may begin to issue IO to a storage array using the signed token. By using the signed token to issue the IO, the storage array may validate that the IO has been issued by a source with sufficient privilege (e.g., to be trusted) to use the services provided by the storage array.

Turning to FIG. 2B, a data flow diagram illustrating issuance of IO using signed tokens in accordance with an embodiment is shown. The IO may be issued, for example, to store data, modified stored data, read data, and/or otherwise utilize data managed by storage array 106.

To issue the IO, host 220 may combine any number of commands (e.g., 222, read/write/delete) and signed token 218 to form an IO unit. The IO unit may be provided to storage array 106.

When the IO unit is obtained by storage array 106, token extraction 232 may be performed. During token extraction 232, signed token 218 may be extracted from the IO unit.

Once extracted, signed token 218 may be ingested by token validation 236. During token validation 236, the authenticity of signed token 218 may be validated using public key 238 (e.g., the public key corresponding to private key 217).

If signed token 218 is validated, storage 238 may recognize user permissions that may be declared on signed token 218. These user permission may, as noted above, define the types of commands that are authorized to be performed by storage array 106 for that user. Upon recognition of user permissions from signed token 218, storage array 106 may perform user permissions enforcement 240. During user permissions enforcement 240, commands from the IO unit may be screened based on the permissions defined by signed token 218. For example, any commands outside the scope of the permissions granted to the user may be discarded without being performed. Once screened, command processing 242 may be performed. During command processing 242, the remaining commands (e.g., from the IO unit and/or other IO units associated with signed token 218) not subject to screening may be performed by storage array 106.

Command 222 may be implemented using one or more data structures that may include instructions regarding data managed by storage array 106.

Token extraction 232 may be implemented using a process that may read signed token 218 from command 222. The process may recognize that the first block of command 222 may be signed token 218 (it will be appreciated that a schema or other system that defines where signed tokens are to be position in IO may be used by the process to read signed tokens and/or remove the signed tokens from the IO). Token extraction 232 may also recognize what information to expect on signed token 218 (e.g., using a schema or other specification regarding the structure of the payload of signed token 218).

Token validation 236 may be implemented using one or more processes. The process may be used to verify host identifiers, including the IP address, MAC address, and HostID identifier for host 200 and included in signed token 218.

Public key 238 may be implemented using a data structure. The data structure may be responsible for decryption of one or more signatures specifically written by identity access manager 104. In decrypting one or more signatures specifically written by identity access manager 104, public key 238 may validate authenticity of signed token 218.

User permissions enforcement 240 may be implemented using one or more processes. User permissions enforcement 240 may screen commands for performance.

Continuing with the example of the onsite system, signed token 218 may have been validated using public key 238. Validation of signed token 218 may permit implementation of user permissions on storage array 106. User permissions enforcement 240 screen the commands based on any number of permissions that may include read and write operations, access to specific files or directories, creation, modification and deletion of files, and execution of applications with varied operations.

Thus, using the flow shown in FIG. 2B, a storage array in accordance with an embodiment may validate IO and screen commands based on permissions.

Figure 3A:
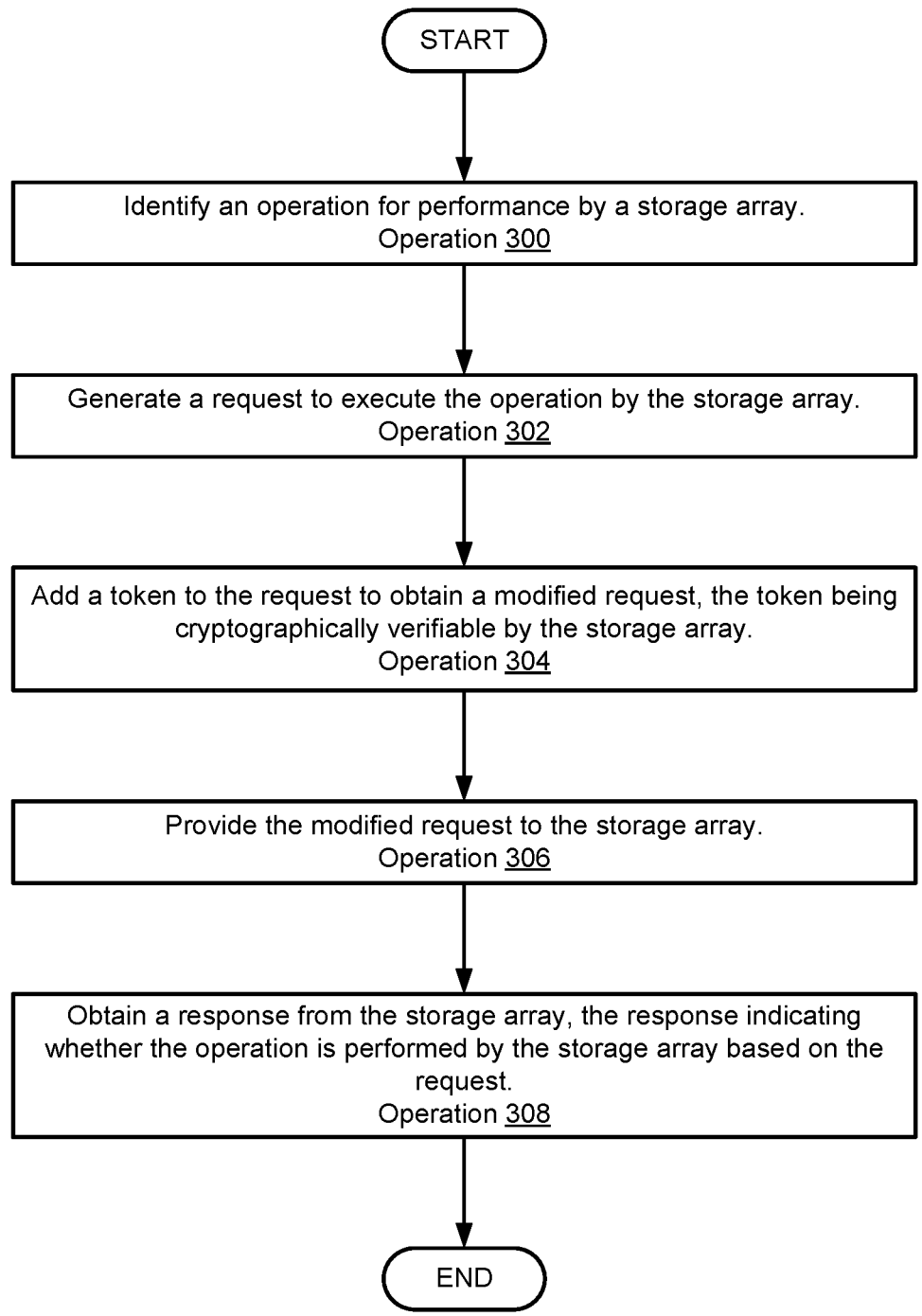
FIGS. 3A-3B show flow diagrams illustrating a method of securing a storage array in accordance with an embodiment.
Figure 3B:
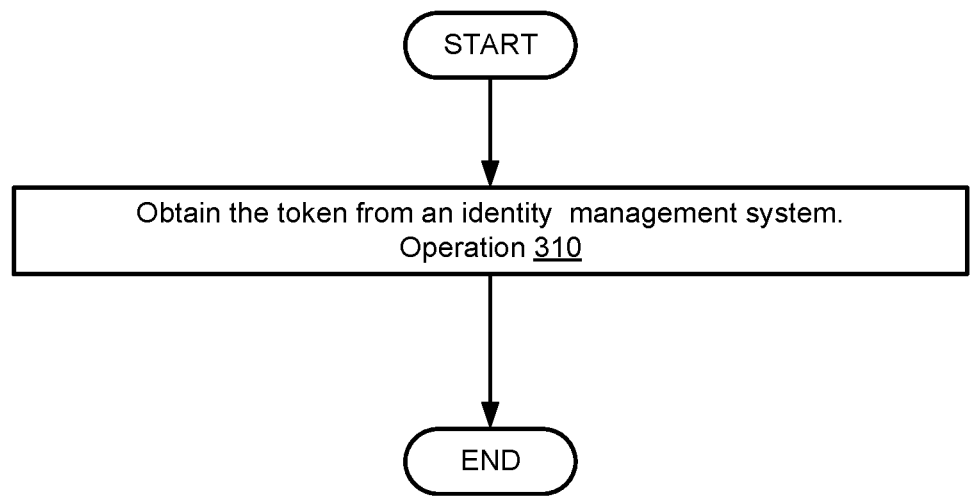

As discussed above, the components of FIG. 1 may perform various methods to secure access to storage array 106 by hosts 100. FIGS. 3A-3B illustrate methods that may be performed by the components of FIG. 1. In the diagrams discussed below and shown in FIGS. 3A-3B, any of the operations may be repeated, performed in different orders, and/or performed in parallel with and/or in a partially overlapping in time manner with other operations.

Turning to FIG. 3A, a flow diagram illustrating access to and operation for performance on a storage array. The method may be performed, for example, by any of storage array 106, identity access manager 104, hosts 100, and/or other components of FIG. 1.

At operation 300, an operation for performance may be identified by a storage array. The operation for performance may be identified by receiving information from an application or other entity hosted by a host. For example, the host may include an application that needs to store data in a storage array. The application may invoke functionality of an operating system or other management entity that manages storage of data. The management entity may generate IO corresponding to the data to be stored. The operation may be part of the IO. The operation may be identified by identifying when IO has been prepared for transmission to the storage array.

At operation 302, a request may be generated to execute the operation by the storage array. The request may be generated by adding the command based on the operation to an IO unit of IO to be transmitted to the storage array.

At operation 304, a token may be added to the request to obtain a modified request. The token may be cryptographically verifiable by the storage array. The token may be added to the request by (i) appending the token to the request as a first block (or a different block specified by a schema) in the request to obtain the modified request, and (ii) increasing a payload size by one block (e.g., based on the appended token). The token may be appended to the request by adding a fixed number of bits with a unique identifier to the request. The payload size may increase by updating metadata for the request that defines the payload size.

The token may be obtained from an identity access manager, or other entity, using the method illustrated in FIG. 3B.

At operation 306, the modified request may be provided to the storage array. The modified request may be provided to the storage array by passing the modified request from the host to the storage array. For example, the modified request may be sent as IO to the storage array. The IO may be sent via any communication medium.

Once obtained by the storage array, the storage array may perform various actions to authenticate and use the IO. The actions may include (i) extracting the token from the modified request, and (ii) attempting to validate that the request is trustworthy using the token. The token may be extracted by reading the token from the request in the IO and/or removing the token from the IO.

Validation of the request may be attempted by checking a signature from the token using a public key associated with an identity management system that generated the token. The signature from the token may be checked by performing a signature verification algorithm using the public key.

If the token is authenticated, then the IO may be processed to the extent limited by permissions for various types of operation specified by the token. For example, if the token cannot be authenticated, it may be treated as not being trustworthy and the IO may not be processed. However, if the token is authenticated, then the IO may be processed so long as the IO operations are within the permissions granted by the token (e.g., the token may limit the types of operations that may be performed to any of read operations, write operations, delete operations, and/or other operations).

At operation 308, a response may be obtained from the storage array. The response may indicate whether the operation is performed by the storage array based on the request. The response may be obtained by receiving the response in a communication from the storage array. For example, if the token cannot be authenticated in operation 306, then the storage array may notify the host that sent the IO that the IO will not be processed.

The method may end following operation 308.

Using the method illustrated in FIG. 3A, a system in accordance with embodiment disclosed herein may secure storage of data in storage arrays by authenticating IO directed to the storage arrays. The IO may be authenticated using signed tokens.

Turning to FIG. 3B, a flow diagram illustrating a method of obtaining signed tokens in accordance with an embodiment is shown. The method may be performed, for example, by any of storage array 106, identity access manager 104, hosts 100, and/or other components of FIG. 1.

At operation 310, the token may be obtained from an identity access manager 104. The token may be obtained by (i) obtaining, by the identity access manager 104, credentials for a user that is attempting to initiate performance of the operation by the storage array, (ii) attempting, by the identity access manager 104, to authenticate the credentials, (iii) in a first instance of the attempting where the credential are authenticated: generating, by the identity access manager 104, the token, the token comprising a private key signature and permissions of a user use of the storage array, and providing, by identity access manager 104, the token to a system that a user is using; and (iv) in a second instance of the attempting where the credentials are not authenticated: denying, by the identity access manager 104, the token to the user.

Credentials for the user may be obtained by accessing the identity access manager 104 for catalogued information on the user. Authentication of the credentials may be authenticated by matching information on the user to information that may be catalogued by the identity access manager 104. The token may be generated by recording user information, access permissions, and cryptographically generated signature on a block of memory. The token to the system that the user is using may be provided by appending the token to the request to obtain a modified request. The token to the user may be denied by not generating a token.

The method may end following operation 310.

Figure 4:
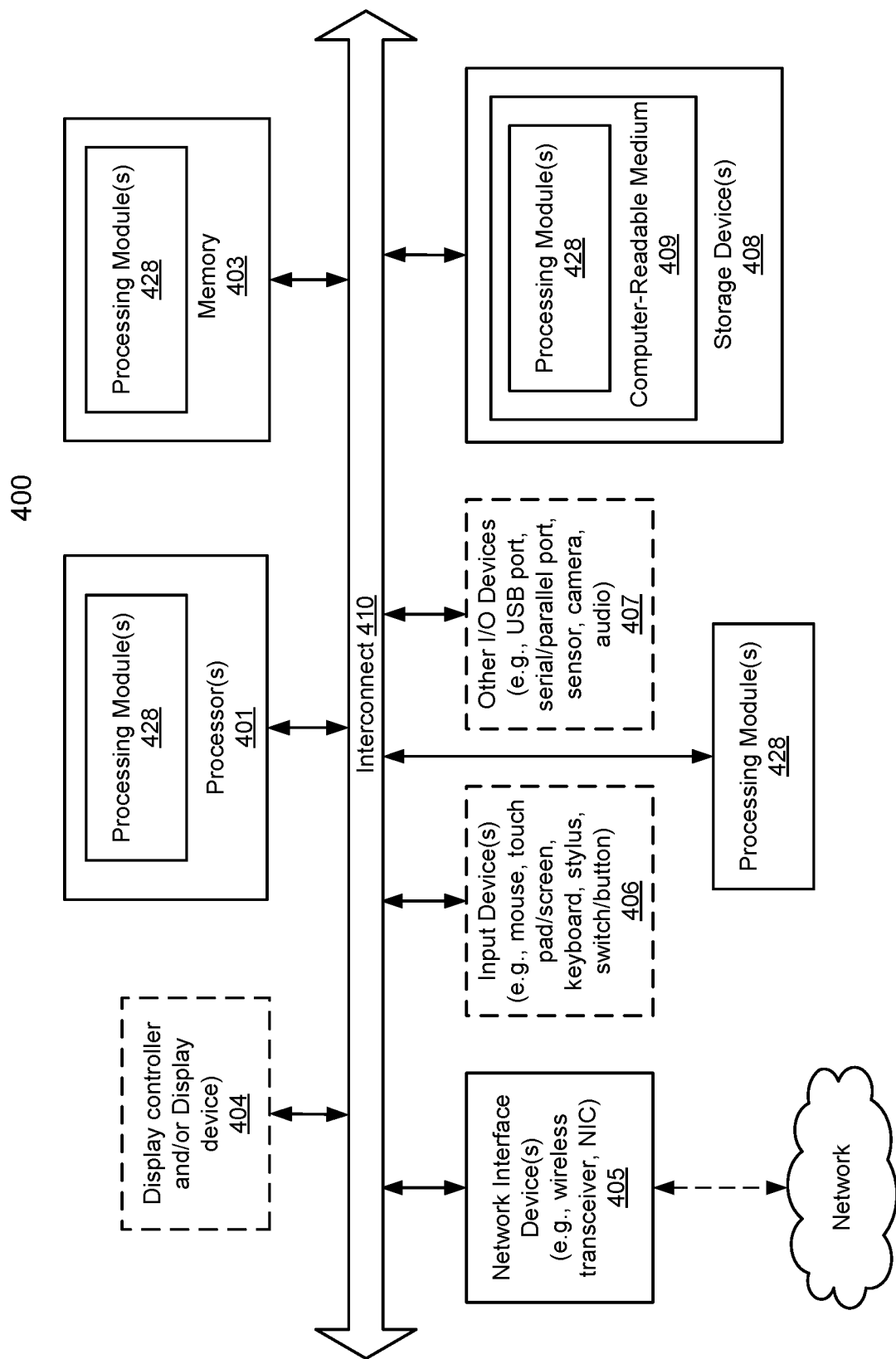
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data, the method comprising:
identifying an operation for performance by a storage array;
generating a request to execute the operation by the storage array;
obtaining a token from an identity management system by, at least:
  obtaining, by the identity management system, credentials for a user that is attempting to initiate performance of the operation by the storage array;
  attempting, by the identity management system, to authenticate the credentials;
  in a first instance of the attempting where the credentials are authenticated:
    generating, by the identity management system, the token, the token comprising a private key signature and permissions of a user use of the storage array, and
    providing, by the identity management system, the token to a system that a user is using; and
  in a second instance of the attempting where the credentials are not authenticated, denying, by the identity management system, the token to the user;
adding the token to the request to obtain a modified request, the token being cryptographically verifiable by the storage array;
providing the modified request to the storage array; and
obtaining a response from the storage array, the response indicating whether the operation is performed by the storage array based on the request.

2. The method of claim 1, wherein adding the token to the request comprises:
appending the token to the request as a first block in the request to obtain the modified request.

3. The method of claim 2, wherein adding the token to the request further comprises:
increasing a payload size of the request by one block.

4. The method of claim 1, further comprising:
extracting, by the storage array, the token from the modified request; and
attempting, by the storage array, to validate that the request is trustworthy using the token.

5. The method of claim 4, further comprising:
in a first instance of the attempting where the request is trustworthy, performing, by the storage array, the operation based on permission for the operation on the storage array specified by the token.

6. The method of claim 4, wherein attempting validate that the request is trustworthy using the token comprises:
checking, by the storage array, a signature from the token using a public key associated with an identity management system that generated the token.

7. The method of claim 5, further comprising:
in a second instance of the attempting where the request is not trustworthy, denying, by the storage array, performance of operation.

8. A non-transitory machine-readable medium having instructions stored therein, which when executed by a processor, cause the processor to perform operations for securing a deployment, the operations comprising, the operation comprising:
identifying an operation for performance by a storage array;
generating a request to execute the operation by the storage array;

obtaining a token from an identity management system by, at least:
  obtaining, by the identity management system, credentials for a user that is attempting to initiate performance of the operation by the storage array;
  attempting, by the identity management system, to authenticate the credentials;
  in a first instance of the attempting where the credentials are authenticated:
    generating, by the identity management system, the token, the token comprising a private key signature and permissions of a user use of the storage array, and
    providing, by the identity management system, the token to a system that a user is using; and
  in a second instance of the attempting where the credentials are not authenticated, denying, by the identity management system, the token to the user;
adding the token to the request to obtain a modified request, the token being cryptographically verifiable by the storage array;
providing the modified request to the storage array; and
obtaining a response from the storage array, the response indicating whether the operation is performed by the storage array based on the request.

9. The non-transitory machine-readable medium of claim 8, wherein adding the token to the request comprises:
appending the token to the request as a first block in the request to obtain the modified request.

10. The non-transitory machine-readable medium of claim 8, wherein the operations further comprise:
extracting, by the storage array, the token from the modified request; and
attempting, by the storage array, to validate that the request is trustworthy using the token.

11. The non-transitory machine-readable medium of claim 10, wherein the operations further comprise:
in a first instance of the attempting where the request is trustworthy, performing, by the storage array, the operation based on permission for the operation on the storage array specified by the token.

12. The non-transitory machine-readable medium of claim 10, wherein attempting validate that the request is trustworthy using the token comprises:
checking, by the storage array, a signature from the token using a public key associated with an identity management system that generated the token.

13. The non-transitory machine-readable medium of claim 10, wherein the operations further comprise:
in a second instance of the attempting where the request is not trustworthy, denying, by the storage array, performance of operation.

14. The non-transitory machine-readable medium of claim 8, wherein adding the token to the request further comprises:
increasing a payload size of the request by one block.

15. A data processing system, comprising:
a processor; and
a memory coupled to the processor to store instructions, which when executed by the processor, cause the processor to perform operations for securing a deployment, the operations comprising:
identifying an operation for performance by a storage array;
generating a request to execute the operation by the storage array;
obtaining a token from an identity management system by, at least:
  obtaining, by the identity management system, credentials for a user that is attempting to initiate performance of the operation by the storage array;
  attempting, by the identity management system, to authenticate the credentials;
  in a first instance of the attempting where the credentials are authenticated:
    generating, by the identity management system, the token, the token comprising a private key signature and permissions of a user use of the storage array, and
    providing, by the identity management system, the token to a system that a user is using; and
  in a second instance of the attempting where the credentials are not authenticated, denying, by the identity management system, the token to the user;
adding the token to the request to obtain a modified request, the token being cryptographically verifiable by the storage array;
providing the modified request to the storage array; and
obtaining a response from the storage array, the response indicating whether the operation is performed by the storage array based on the request.

16. The data processing system of claim 15, wherein adding the token to the request comprises:
appending the token to the request as a first block in the request to obtain the modified request.

17. The data processing system of claim 16, wherein adding the token to the request further comprises:
increasing a payload size of the request by one block.

18. The data processing system of claim 15, wherein the operations further comprise:
extracting, by the storage array, the token from the modified request; and
attempting, by the storage array, to validate that the request is trustworthy using the token.

19. The data processing system of claim 18, wherein the operations further comprise:
in a first instance of the attempting where the request is trustworthy, performing, by the storage array, the operation based on permission for the operation on the storage array specified by the token; and
in a second instance of the attempting where the request is not trustworthy, denying, by the storage array, performance of operation.

20. The data processing system of claim 18, wherein attempting validate that the request is trustworthy using the token comprises:
checking, by the storage array, a signature from the token using a public key associated with an identity management system that generated the token.

* * * * *